(12) United States Patent
Pedersen et al.

(10) Patent No.: US 9,072,059 B2
(45) Date of Patent: Jun. 30, 2015

(54) INTERFERENCE CONTROL

(75) Inventors: Klaus Ingemann Pedersen, Aalborg (DK); Luis Garcia, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 338 days.

(21) Appl. No.: 13/518,476

(22) PCT Filed: Dec. 23, 2009

(86) PCT No.: PCT/EP2009/067891
§ 371 (c)(1),
(2), (4) Date: Jul. 24, 2012

(87) PCT Pub. No.: WO2011/076283
PCT Pub. Date: Jun. 30, 2011

(65) Prior Publication Data
US 2012/0282960 A1 Nov. 8, 2012

(51) Int. Cl.
*H04B 7/00* (2006.01)
*H04W 52/24* (2009.01)

(52) U.S. Cl.
CPC .............. *H04W 52/243* (2013.01); *Y02B 60/50* (2013.01)

(58) Field of Classification Search
CPC ........................... H04W 52/24; H04W 52/243

USPC .............. 455/69, 522, 501, 515, 63.1, 67.11, 455/67.13, 509, 452.1
See application file for complete search history.

(56) References Cited

U.S. PATENT DOCUMENTS

2007/0082619 A1* 4/2007 Zhang et al. .................... 455/69
2009/0239569 A1* 9/2009 Dottling et al. ............... 455/522

FOREIGN PATENT DOCUMENTS

WO   WO 2007/044281 A1   4/2007
WO   WO 2009/068727 A1   6/2009

* cited by examiner

*Primary Examiner* — John J Lee
(74) *Attorney, Agent, or Firm* — Harrington & Smith (57) ABSTRACT

When it is determined that a first estimate of the total level of interference towards transmissions associated with a first access node from transmissions associated with other access nodes exceeds a predetermined target maximum value; then in dependence on the extent to which said first estimate exceeds said target maximum value, selecting one or more of said other access nodes to which to make a request to reduce the transmission power of interfering transmissions, and/or selecting an amount by which to request any one or more of said other access nodes to reduce the transmission power of interfering transmissions.

15 Claims, 4 Drawing Sheets

INTERFERENCE CONTROL

The present invention relates to controlling interference towards transmissions made by one access node to one or more communication devices from transmissions made by one or more other access nodes. In one embodiment, it relates to controlling interference towards transmissions made by one access node to one or more communication devices on a frequency block comprising a plurality of orthogonal subcarriers from transmissions made by one or more other access nodes on the same frequency block.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (EUTRAN).

In the Long Term Evolution (LTE) System Release 8, downlink transmissions are made according to an orthogonal frequency division multiple access (OFDMA) technique, and uplink transmissions are made according to a single carrier frequency division multiple access (SCFDMA) technique. Each transmission is made using a group of orthogonal sub-carriers. Sub-carriers are grouped into units called resource blocks, and a user device can make or receive transmissions using groups of resource blocks ranging up to a predetermined maximum number of resource blocks within a predetermined frequency block called a component carrier. The bandwidth available for transmissions between a device and a radio access network node generally comprises a plurality of component carriers; and each transmission is made on a selected one of the component carriers. A further development of LTE Release 8 (which development is known as LTE-Advanced) provides for carrier aggregation, where two or more component carriers are aggregated in order to support transmission bandwidths wider than that defined by a single component carrier. In summary, devices operating under LTE Release 8 are served by a single component carrier, whereas devices operating under LTE-Advanced can receive or transmit simultaneously on a plurality of component carriers. The Medium Access Control layer (MAC layer) generates respective transport blocks for each scheduled component carrier, and all possible HARD repeat transmissions for any transport block take place on the same component carrier to which the respective transport block was mapped.

In a system where a communication device can detect transmissions from a plurality of access nodes (e.g. cell base stations in a cellular network), it is proposed that each access node automatically selects one and only one of the component carriers as its primary component carrier (PCC) or base carrier when the access node is powered on. Depending on the interference conditions and traffic requirements, each access node also autonomously selects one or more additional component carriers as secondary component carriers.

The main purpose of secondary component carriers is to provide additional capacity whenever possible, and relatively frequent reselection by an access node of different carriers as its secondary component carrier(s) is envisaged. In contrast, the primary component carrier is used for essential functions such as setting up calls between the access node and a communication device; and it is proposed to put strong emphasis on assuring the quality of the PCC for any access node, and to make the reselection of a new component carrier as PCC as infrequent as possible.

According to one proposal, any access node (e.g. eNB) detecting problems with quality of transmission on its PCC will first attempt to improve quality by requesting any neighbouring access nodes using the same component carrier as a secondary component carrier to stop making transmissions on that component carrier. As discussed in more detail below, the inventors have identified a number of potential problems with this approach, and it is an aim of the present invention to provide an alternative technique aimed at maintaining the quality of PCC transmissions from an access node.

The present invention provides a method, comprising: determining that a first estimate of the total level of interference towards transmissions associated with a first access node from transmissions associated with other access nodes exceeds a predetermined target maximum value; and in dependence on the extent to which said first estimate exceeds said target maximum value, selecting one or more of said other access nodes to which to make a request to reduce the transmission power of interfering transmissions, and/or selecting an amount by which to request any one or more of said other access nodes to reduce the transmission power of interfering transmissions.

In one embodiment, the method further comprises: storing a group of second estimates, wherein each second estimate is an estimate of the ratio of (a) the power at which a device receives transmissions from the first access node to (b) the power at which a device receives transmissions from a respective one of said other access nodes; and calculating said first estimate from said group of second estimates.

In one embodiment, calculating said first estimate from said group of second estimates comprises calculating the inverse of the sum of the inverses of the second estimates.

In one embodiment, the frequency spectrum allocated to said first access node and said other access nodes is divided into a plurality of frequency blocks, and said transmissions associated with said first access node and said transmissions associated with said other access nodes include transmissions made via one of said frequency blocks that is designated as a primary frequency block for said first access node and as a secondary frequency block for said other access nodes.

In one embodiment, the method further comprises: in order of the lowness of said second estimates, sending a request to stop transmissions on said one frequency block to as many of said other access nodes as is calculated from said first estimate and said second estimates to be necessary to return said first estimate to a value that is no greater than said target maximum value.

In one embodiment, the method further comprises; in order of the lowness of said second estimates, sending a request to stop transmissions on said one frequency block and/or a request to partially reduce transmission power on said one frequency block, to as many of said other access nodes as is calculated from said first estimate and said second estimates to be necessary to return said first indicator to said target maximum value.

In one embodiment, said second estimates are also used by the first access node to select one or more frequency blocks for transmissions from the first access node.

The present invention also provides an apparatus, configured to: when it is determined that a first estimate of the total level of interference towards transmissions associated with a first access node from transmissions associated with other access nodes exceeds a predetermined target maximum value; then in dependence on the extent to which said first estimate exceeds said target maximum value, select one or more of said other access nodes to which to make a request to reduce the transmission power of interfering transmissions, and/or select an amount by which to request any one or more of said other access nodes to reduce the transmission power of interfering transmissions.

In one embodiment, the apparatus is further configured to: store a group of second estimates, wherein each second estimate is an estimate of the ratio of (a) the power at which a device receives transmissions from the first access node to (b) the power at which a device receives transmissions from a respective one of said other access nodes; and calculate said first estimate from said group of second estimates.

In one embodiment, calculating said first estimate from said group of second estimates comprises calculating the inverse of the sum of the inverses of the second estimates.

In one embodiment, the frequency spectrum allocated to said first access node and said other access nodes is divided into a plurality of frequency blocks, and said transmissions associated with said first access node and said transmissions associated with said other access nodes include transmissions made via one of said frequency blocks that is designated as a primary frequency block for said first access node and as a secondary frequency block for said other access nodes.

In one embodiment, the apparatus is further configured to: in order of the lowness of said second estimates, send a request to stop transmissions on said one frequency block to as many of said other access nodes as is calculated from said first estimate and said second estimates to be necessary to return said first estimate to a value that is no greater than said target maximum value.

In one embodiment, the apparatus is further configured to: in order of the lowness of said second estimates, send a request to stop transmissions on said one frequency block and/or a request to partially reduce transmission power on said one frequency block, to as many of said other access nodes as is calculated from said first estimate and said second estimates to be necessary to return said first indicator to said target maximum value.

In one embodiment, said second estimates are also used by the first access node to select one or more frequency blocks for transmissions from the first access node.

The present invention also provides an apparatus comprising: a processor and memory including computer program code, wherein the memory and the computer program are configured to, with the processor, cause the apparatus at least to carry out any of the above methods.

The present invention also provides a computer program product comprising program code means which when loaded into a computer controls the computer to perform any of the above methods.

Figure 1:
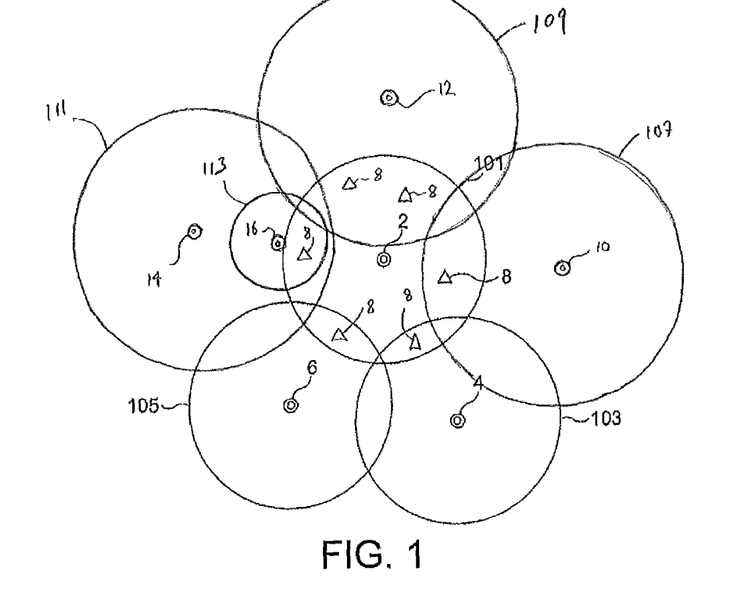
FIG. 1 illustrates a radio access network within which an embodiment of the invention may be implemented, which access network includes a number of cells each served by a respective base station (eNodeB)
Figure 2:
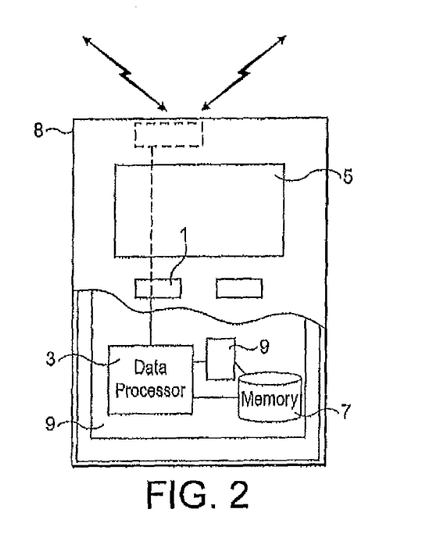
FIG. 2 illustrates a user equipment shown in FIG. 1 in further detail.
Figure 3:
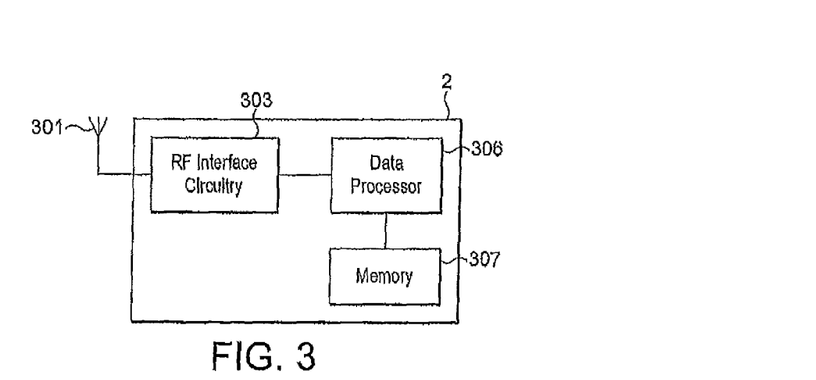
FIG. 3 illustrates an apparatus suitable for implementing an embodiment of the invention at an access node or base station of the radio network shown in FIG. 1.

Hereunder an embodiment of the present invention will be described, by way of example only, with reference to the following drawings, in which:

FIGS. 1, 2 and 3 show respectively the communication system or network, an apparatus for communication within the network, and an access node of the communications network.

FIG. 1 shows a communications system or network comprising a first access node 2 with a first coverage area 101, and a plurality of other access nodes 4, 6,10, 12, 14, 16 whose coverage areas 103, 105, 107, 109, 111, 113 overlap with that of access node 2. Furthermore, FIG. 1 shows user equipment 8 in locations where downlink transmissions from access node 2 are potentially subject to interference from downlink transmissions from one or more of the other access nodes 4, 6, 10, 12, 14, 16. These coverage areas may also be known as cellular coverage areas or cells where the access network is a cellular communications network; and the other access nodes may include one or more access nodes such as access node 16 which have a relatively small coverage area completely within the relatively large coverage area of another access node. Such small coverage area access nodes can be useful, for example, where there is generally a high probability of a relatively high concentration of users in the coverage area.

FIG. 2 shows a schematic partially sectioned view of an example of user equipment 8 that may be used for accessing the access nodes and thus the communication system via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

FIG. 3 shows an example of apparatus for use at any of access nodes, which in the embodiment of the invention described below are represented by an evolved node B (eNB). The eNB comprises a radio frequency antenna 301 configured to receive and transmit radio frequency signals, radio frequency interface circuitry 303 configured to interface the radio frequency signals received and transmitted by the antenna 301 and the data processor 167. The radio frequency interface circuitry may also be known as a transceiver. The access node (evolved node B) may also comprise a data processor configured to process signals from the radio frequency interface circuitry 303, control the radio frequency interface circuitry 303 to generate suitable RF signals to communicate information to a UE 8 via the wireless communications link. The access node further comprises a memory 307 for storing data, parameters and instructions for use by the data processor 305.

It would be appreciated that both a UE 8 and an access node 2 shown in FIGS. 2 and 3 respectively and described above may comprise further elements which are not directly involved with the embodiments of the invention described hereafter.

An embodiment of the present invention is described below, by way of example only, in the context of a LTE (Long Term Evolution) Advanced system that employs Orthogonal Frequency Division Multiple Access (OFDMA) for downlink transmissions from the access nodes to the user equipments.

A portion of the frequency spectrum reserved for transmissions between an access node and a UE 8 is divided up into a plurality of frequency blocks (component carriers). The access node can make simultaneous transmissions to a UE 8 on a plurality of the component carriers and it can receive simultaneous transmissions from a UE 8 on a plurality of the component carriers. Each carrier is divided up into orthogonal sub-carriers, which can be allocated as radio resources to a transmission in groups thereof. Radio resources (resource blocks defining groups of orthogonal sub-carriers within one or more component carriers) are allocated to downlink transmissions from the access node if data is available to be sent from UE 8.

We hereunder use the example of access node 2 to describe an operation of an access node according to an embodiment of the invention.

Each UE 8 measures the strength at which it detects respective reference signals transmitted by each access node, and sends this reference signal received power (RSRP) information to access node 2. For each UE 8 from which the access node 2 receives this RSRP information, the access node 2 calculates a set of decibel values respectively indicating the relationship between the RSRP for the access node 2 and the RSRP for a respective one of the other access nodes 4, 6, 10, 12, 14, 16. This respective decibel (dB) value for each of the other access nodes 4, 6, 10, 12, 14, 16 is determined as $10*\log_{10}(P_0/P_n)$, wherein $P_0$ is the reference signal received power (RSRP) for the reference signals transmitted by access node 2 and $P_n$ is the RSRP for the reference signals transmitted by the respective one of the other access nodes. Access node 2 collects this information for each of the UEs 8 from which it receives RSRP information, and determines therefrom a respective carrier-to-interference ratio (CIR) for each of the other access nodes. Each CIR is determined as the lowest decibel value of the highest X % of all of the above-mentioned decibel values expressing a relationship between the RSRP for access node 2 and that for the respective other access node. In one example, X is 95.

Each statistical CIR expresses the interference coupling between a pair of access nodes (access node 2 and a respective one of the other access nodes). Each value expresses the CIR (given a certain outage probability X %, e.g. 95%) experienced by UEs 8 on the interfered side (i.e. UEs receiving transmissions from access node 2) in case the respective other access node uses the same component carrier simultaneously. In other words, disregarding the interference effects of the remainder of the other access nodes, if access node 2 and the one of the other access nodes to which the CIR relates use the same component carrier at the same time, only (100−X) %, e.g. 5% of the UEs 8 served by access node 2 are expected to experience CIR values lower than the CIR value that access node 2 stores for that one of the other access nodes.

Access node 2 stores a respective CIR value for each of the other access nodes using as a secondary component carrier (SCC) the same component carrier that access node 2 is using for its primary component carrier (PCC). These CIR values are stored in the form of a background interference matrix, in which the CIR values are arranged in order of their magnitude.

To provide an estimate of the aggregated CIR ($CIR_{total}$) for access node 2, access node 2 performs the calculation expressed by formula (1) below:

$$\left[ \sum_{j=1}^{N_I} (CIR_j)^{-1} \right]^{-1} \quad (1)$$

wherein $N_I$ denotes the total number of interfering access nodes using the PCC of access node 2 as a SCC.

In the above calculation and also the other calculations mentioned below, the $CIR_j$ values are linear values. Where the CIR values are stored in the background interference matrix as dB values, these are first converted into linear values before being used in these calculations.

To provide an estimate of to what extent ($I_{gap}$) the total interference exceeds a target maximum level, access node 2 further performs the calculation expressed by formula (2) below, where $CIR_{target}$ is a configurable minimal target CIR for the primary component carrier, and implicitly defines a target maximum interference level.

$$(CIR_{total})^{-1} * CIR_{target} \qquad (2)$$

Access node 2 can thus derive an estimate of how much interference needs to be removed in order to reduce the total level of interference to a value no greater than the target maximum value.

Where the result of the calculation according to formula (2) is greater than 1 (i.e. the total level of interference is greater than the target maximum level), access node 2 then performs the calculation expressed by Formula (3) below to provide an estimate of the Interference Weight ($IW_j$) of the dominant interferer, i.e. the access node associated with the smallest CIR value stored in the background interference matrix at access node 2.

$$(CIR_j)^{-1} * CIR_{total} \qquad (3)$$

Where, by a comparison of the results of Formula (2) and Formula (3), access node 2 determines that elimination of the interference from the dominant interferer alone would bring the total interference down to a level no greater than the target maximum value, access node 2 sends a request to the access node that is the dominant interferer to stop making transmissions on the component carrier that access node 2 is using as its PCC, but does not send any such request to any of the other access nodes, whereby those other access nodes are free to continue making transmissions on the component carrier that access node 2 is using as its PCC.

On the other hand, if a comparison of the results of Formula (2) and Formula (3), access node 2 indicates that elimination of the interference contribution from the dominant interferer alone would not be sufficient to bring the total interference down to a level no greater than the target maximum value, access node 2 then calculates how many of the largest interferers need to have their interference contribution eliminated in order to bring the total interference down to a level no greater than the target maximum level. This is done by calculating the combined interference weight ($IW_s$) for progressively increasing sets of the largest interferers according to the following Formula (4) until the calculated combined interference weight $IW_s$ is sufficiently large in relation to the result of Formula (2).

$$\left[\sum_{j=1}^{Ns}(CIR_j)^{-1}\right]^{-1} * CIR_{total} \qquad (4)$$

In more detail, access node 2 would start by calculating the combined interference weight for the two largest interferers (S=2 in Formula (4)); and then, if necessary, continue by calculating the combined interference weight for the three largest interferers (S=3 in Formula (4)), and so on.

Access node then sends "mute" requests to only those interferers (access nodes) identified as candidates for elimination by the calculations of Formula (4), but does not send such "mute" requests to any of the other interferers/access nodes.

Figure 4:
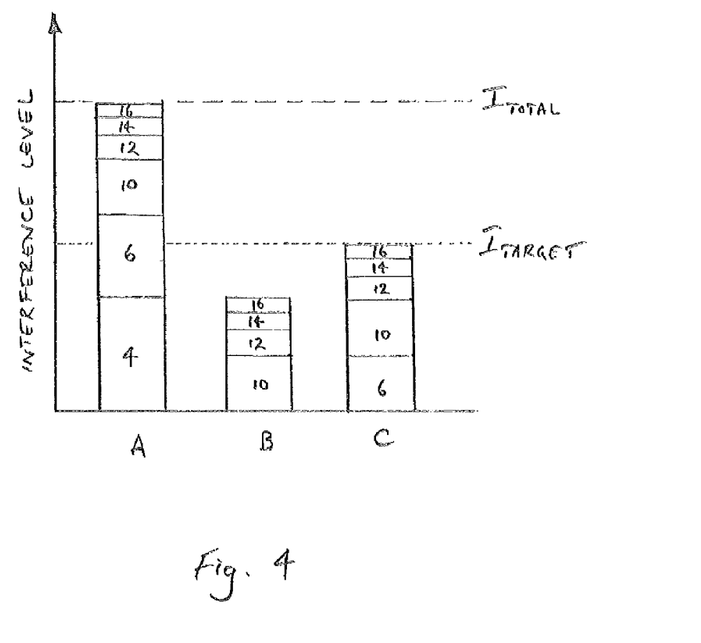
FIG. 4 illustrates two techniques by which a reduction of interference is achieved according to an embodiment of the present invention.
Figure 5:
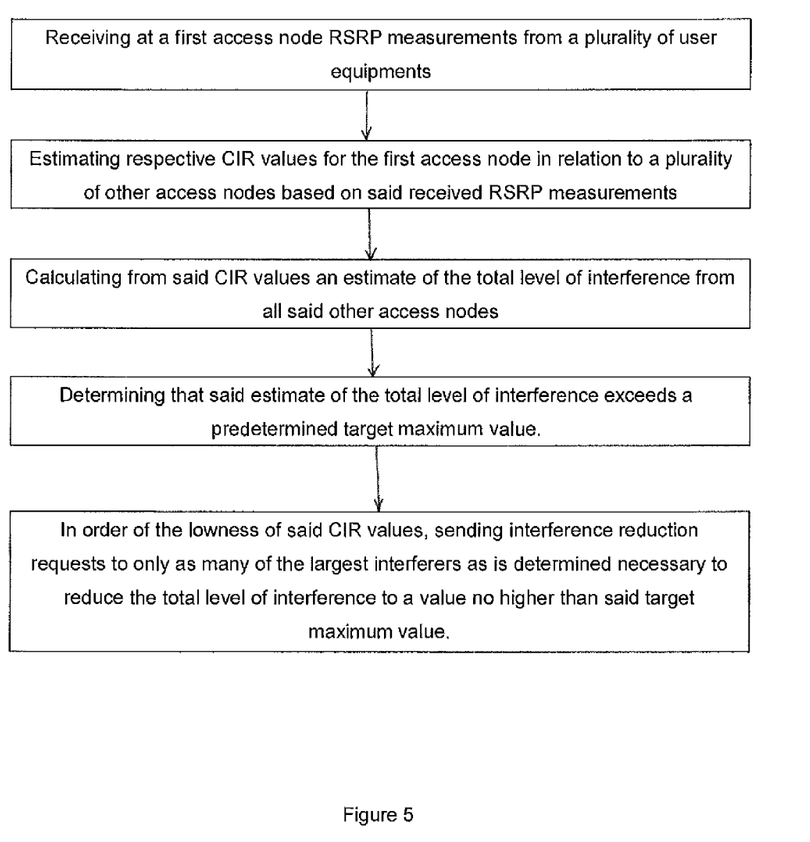
FIG. 5 illustrates an example of the operation of access node 2 in accordance with an embodiment of the present invention.

This technique is illustrated by the flow chart of FIG. 5 and by the first two bars (A) and (B) in the chart of FIG. 4. In the example illustrated in FIG. 4, the calculations according to Formula (4) determine that it is sufficient to send the above-mentioned "mute" requests to only the two access nodes that are the two largest interferers (access nodes 4 and 6 in the example illustrated in FIG. 4). In the chart of FIG. 4, the height of each sub-bar represents the interference weight of a respective neighbouring access node, i.e. the estimated contribution of a respective neighbouring access node to the total interference power.

One variation of the above-described techniques is illustrated by the first and third bars A and C in FIG. 4. The calculations according to Formula (4) indicate that elimination of the two largest interferers (access nodes 4 and 6 in the example illustrated in FIG. 4) would bring the level of total interference down to a level below the target maximum value. In such a case, access node 2 sends to the largest interferer (or more generally, all but the smallest of the one or more largest interferers identified as interferers to be eliminated by the calculations according to Formula (4)) a request to completely stop making transmissions on the component carrier that access node 2 is using for its PCC, and sends to the second largest interferer (more generally, the smallest of the one or more largest interferers identified as interferers to be eliminated by the calculations according to Formula (4)) a request to reduce transmission power on said component carrier by an amount calculated as sufficient to bring the total level of interference down to the target maximum value.

According to one variation of the above-described techniques, the interference reduction process may be triggered by a single UE 8 experiencing poor transmission quality. In this case, the access node 2 would employ the same technique as described above but would first consider those other access nodes that are in the UEs handover candidate set as candidates for sending an interference reduction request, instead of considering interfering access nodes in the order of the lowness of their CIR values in the background interference matrix. If sending mute requests to all such other access nodes identified in the UEs handover candidate set is calculated to be sufficient to bring the estimate of the total interference down to a value no higher than the target maximum value, access node 2 would then consider sending interference reduction requests to remaining interfering access nodes in the order of the lowness of their CIR values in the background interference matrix stored at access node 2.

The above-described techniques make it possible to make autonomous decisions about which neighbouring access nodes are to mute or reduce the transmission power of transmissions on the component carrier that the access node 2 is using as its PCC. The above-described techniques are considered to be particularly useful, where a rather limited amount of interferers account for most of the total interference. Identifying the main interferers in this way and sending addressed interference reduction requests to those interferers has the advantage of preventing the lesser interferers from having to limit the number of component carriers that they can use as secondary component carriers.

According to another variation, access node 2 does not send mute requests to any of the other access nodes, but sends to each and all of the other access nodes a request to reduce transmission power by a respective amount proportional to the interference weight of each access node, which amounts are in sum sufficient to bring the estimated total level of interference down to the target maximum level.

In the above-described techniques, the CIR values that access node 2 stores in the form of a background interference matrix are also used by the access node 2 to select secondary component carriers (SCC) for its own transmissions. Access node 2 is configured to use only those component carriers which the CIR values indicate will not have an unacceptable impact on the performance of neighbouring cells. One proposal for how this can be achieved is described in 3GPP Tdoc R1-09235.

In the above-described embodiment, one example for a component carrier size is 20 MHz, and one example for the number of components carriers from which an access node can select a PCC and one or more SCCs is five.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
    determining that a first estimate of the total level of interference towards transmissions associated with a first access node from transmissions associated with other access nodes exceeds a predetermined target maximum value;
    in dependence on the extent to which said first estimate exceeds said target maximum value,
        selecting one or more of said other access nodes to which to make a request to reduce the transmission power of interfering transmissions,
        selecting an amount by which to request any one or more of said other access nodes to reduce the transmission power of interfering transmissions, or both;
    storing a group of second estimates, wherein each second estimate is an estimate of a ratio of (a) the power at which a device receives transmissions from the first access node to (b) the power at which a device receives transmissions from a respective one of said other access nodes; and
    calculating said first estimate from said group of second estimates.

2. A method according to claim 1, wherein calculating said first estimate from said group of second estimates comprises calculating the inverse of the sum of the inverses of the second estimates.

3. A method according to claim 1, wherein the frequency spectrum allocated to said first access node and said other access nodes is divided into a plurality of frequency blocks, and said transmissions associated with said first access node and said transmissions associated with said other access nodes include transmissions made via one of said frequency blocks that is designated as a primary frequency block for said first access node and as a secondary frequency block for said other access nodes.

4. A method according to claim 3, comprising, in order of the lowness of said second estimates, sending a request to stop transmissions on said one frequency block to as many of said other access nodes as is calculated from said first estimate and said second estimates to be necessary to return said first estimate to a value that is no greater than said target maximum value.

5. A method according to claim 3, comprising, in order of the lowness of said second estimates, sending a request to stop transmissions on said one frequency block and/or a request to partially reduce transmission power on said one frequency block, to as many of said other access nodes as is calculated from said first estimate and said second estimates to be necessary to return said first indicator to said target maximum value.

6. A method according to claim 1, wherein said second estimates are also used by the first access node to select one or more frequency blocks for transmissions from the first access node.

7. An apparatus comprising: a processor and memory including computer program code, wherein the memory and the computer program are configured to, with the processor, cause the apparatus at least to carry out the method of claim 1.

8. A computer program product comprising program code means which when loaded into a computer controls the computer to perform a method according to claim 1.

9. An apparatus, configured to: when it is determined that a first estimate of the total level of interference towards transmissions associated with a first access node from transmissions associated with other access nodes exceeds a predetermined target maximum value; then in dependence on the extent to which said first estimate exceeds said target maximum value, select one or more of said other access nodes to which to make a request to reduce the transmission power of interfering transmissions, and/or select an amount by which to request any one or more of said other access nodes to reduce the transmission power of interfering transmissions; store a group of second estimates, wherein each second estimate is an estimate of a ratio of (a) the power at which a device receives transmissions from the first access node to (b) the power at which a device receives transmissions from a respective one of said other access nodes; and calculate said first estimate from said group of second estimates.

10. An apparatus according to claim 9, wherein calculating said first estimate from said group of second estimates comprises calculating the inverse of the sum of the inverses of the second estimates.

11. An apparatus according to claim 9, wherein the frequency spectrum allocated to said first access node and said other access nodes is divided into a plurality of frequency blocks, and said transmissions associated with said first access node and said transmissions associated with said other access nodes include transmissions made via one of said frequency blocks that is designated as a primary frequency block for said first access node and as a secondary frequency block for said other access nodes.

12. An apparatus according to claim 11, further configured to: in order of the lowness of said second estimates, send a request to stop transmissions on said one frequency block to as many of said other access nodes as is calculated from said first estimate and said second estimates to be necessary to return said first estimate to a value that is no greater than said target maximum value.

13. An apparatus according to claim 11, further configured to: in order of the lowness of said second estimates, send a request to stop transmissions on said one frequency block and/or a request to partially reduce transmission power on said one frequency block, to as many of said other access nodes as is calculated from said first estimate and said second estimates to be necessary to return said first indicator to said target maximum value.

14. An apparatus according to claim 9, wherein said second estimates are also used by the first access node to select one or more frequency blocks for transmissions from the first access node.

15. An apparatus comprising:
a processor and memory including computer program code, wherein the memory and the computer program are configured to, with the processor, cause the apparatus at least to carry out a method comprising:
when it is determined that a first estimate of the total level of interference towards transmissions associated with a first access node from transmissions associated with other access nodes exceeds a predetermined target maximum value; then in dependence on the extent to which said first estimate exceeds said target maximum value, selecting one or more of said other access nodes to which to make a request to reduce the transmission power of interfering transmissions, and/or selecting an amount by which to request any one or more of said other access nodes to reduce the transmission power of interfering transmissions;
storing a group of second estimates, wherein each second estimate is an estimate of a ratio of (a) the power at which a device receives transmissions from the first access node to (b) the power at which a device receives transmissions from a respective one of said other access nodes; and
calculating said first estimate from said group of second estimates.

* * * * *